(12) United States Patent
Ackerman

(10) Patent No.: US 6,256,777 B1
(45) Date of Patent: Jul. 3, 2001

(54) METHOD AND APPARATUS FOR DEBUGGING OF OPTIMIZED MACHINE CODE, USING HIDDEN BREAKPOINTS

(75) Inventor: William B. Ackerman, North Billerica, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/169,417

(22) Filed: Oct. 9, 1998

(51) Int. Cl.$^7$ .................................................. G06F 9/45
(52) U.S. Cl. ............................................ 717/4; 717/5
(58) Field of Search ............................................. 717/4, 5

(56) References Cited

U.S. PATENT DOCUMENTS

| | | | |
|---|---|---|---|
| 4,953,084 | * 8/1990 | Meloy et al. | 717/4 |
| 5,265,254 | * 11/1993 | Blasciak et al. | 717/5 |
| 5,533,192 | * 7/1996 | Hawley et al. | 717/5 |
| 5,812,850 | * 9/1998 | Wimble | 717/4 |
| 5,881,288 | * 3/1999 | Sumi et al. | 717/4 |
| 5,889,981 | * 3/1999 | Betker et al. | 717/4 |
| 5,956,479 | * 9/1999 | McInerney et al. | 717/4 |
| 5,956,512 | * 9/1999 | Simmons et al. | 717/4 |
| 6,091,896 | * 7/2000 | Curreri et al. | 717/4 |

OTHER PUBLICATIONS

Rosenberg, J.B.; How Debuggers Work: Algorithms, Data Structures, and Architecture. New York, NY, John Wiley, Chapter 6, pp. 107–133, Dec.–1996.*

Copperman et al.; "Technical Correspondence: A Further Note on Hennessy's 'Symbolic Debugging of Optimized Code'". ACM Transactions on Programming Languages and Systems, vol. 15, Iss 2, pp. 357–365, Apr. 1993.*

Brooks et al.; "A New Approach to Debugging Optimized Code". Proceedings of the 5th ACM SIGPLAN, pp 1–11, Jun. 1992.*

Iyengar et al.; "An event–based, retargetable debugger". Hewlett–Packard Journal, v45, n6, p33(11), Dec. 1994.*

Ackerman, M.; "Multilevel debugger". PC Tech Journal, v5, n3, p90(7), Mar. 1987.*

Hewlett Packard Company; "HP/DDE Debugger User's Guide". Accessed on Aug. 07, 2000. Retrieved from the Internet: http://docs.hp.com:80/dynaweb/hpux10/dtdeen0a/b53/@Generic_BookTextView;hf=0, Jul. 1996.*

(List continued on next page.)

Primary Examiner—James P. Trammell
Assistant Examiner—Kelvin Booker

(57) ABSTRACT

A debugging method is described wherein a debug information file is constructed which includes information that identifies changes of variable value assignments to registers at plural steps of program. The information further includes data that identifies any change of sequence of machine code instructions from the sequence of source code instructions that gave rise to the machine code instructions. Using such information, hidden breakpoints are inserted into the machine code (wherein a hidden breakpoint enables access to an instruction to either store a variable value from an identified register or to move to a machine code instruction that corresponds in order to a source code instruction that gave rise to the machine code instruction). Thereafter, the program is executed under control of a debug program and, upon encountering a hidden breakpoint, automatically either stores the variable value that exists in the identified register or moves to execute a machine code instruction that is indicated by the hidden breakpoint. The actions carried out in response to encountering the hidden breakpoint are invisible to the user.

17 Claims, 4 Drawing Sheets

OTHER PUBLICATIONS

Carnegie Mellon University, School of Computer Science, 1993, pp. 371–383, Adl–Tabatabai et al., "Evicted Variables and the Interaction of Global Register Allocation and Symbolic Debugging".

Carnegie Mellon University, School of Computer Science, 1993, pp. 13–25, Adl–Tabatabai et al., "Detection and Recovery of Endangered Variables Caused by Instruction Scheduling".

Proceedings of SIGPLAN 1988, Conference of Programming Language Design & Implementation, pp. 125–134, D. S. Coutant et al., "DOC: A Practical Approach to Source–Level Debugging of Globally Optimized Code".

Univ. of California at Santa Cruz, Board of Studies in Computer and Information Sciences, May 8, 1992, pp. 1–40, Max Copperman, "Debugging Optimized Code Without Being Misled".

* cited by examiner

DEBUG EXECUTION

WITHOUT USER INTERVENTION:
—AT EACH (HBPv), STORE
  VARIABLE IN VARIABLE TABLE

—USING COMMAND AT EACH (HBPi)
  EXECUTE MACHINE CODE INSTR'S
  IN SOURCE ORDER

METHOD AND APPARATUS FOR DEBUGGING OF OPTIMIZED MACHINE CODE, USING HIDDEN BREAKPOINTS

FIELD OF THE INVENTION

This invention relates to a method and apparatus for debugging of optimized machine code and, more particularly, to a method and apparatus which enables a debugging operation to proceed on optimized machine code, while allowing access to all variables used in the optimized machine code and causing the optimized machine code to execute in source code order.

BACKGROUND OF THE INVENTION

A compiler is a program that reads a program written in a first language, i.e., the source language, and translates the first language to an equivalent program in a second language, i.e., a target or machine code language. During the process of compiling a source language into a machine language, the compiler generates an intermediate representation which is then subjected to an optimization action, prior to being output as the machine code. The code optimization phase attempts to improve the intermediate language so that faster executing machine code will result.

During an optimizing action, the compiler may reorder or eliminate the execution of source level expressions. Such reordering or elimination destroys the sequential correspondence between the source statements and the machine code statements, while potentially rendering the machine code into a more efficiently executing program.

Debugging allows a user to control the execution of a program (e.g., by the setting of breakpoints) and to inspect the state of execution of the program at each breakpoint (e.g., to print a current value of a variable). A symbolic debugger is a program wherein all interactions are in terms of the source level language program from which the machine code has been derived. An optimizing compiler makes more difficult the task of the symbolic debugger by complicating the correspondence between the source code and the machine code. Any reordering or elimination of source level expressions complicates the mapping of breakpoints and values in the source code to those in the machine code.

In addition to statement reordering or elimination, an optimizer performs "lifetime shortening" actions with respect to variables used in the program. More particularly, machine code generated by the optimizer will discard the value of a variable as soon as the compiler can see no further need for it—even though it would be useful for a debugger if the compiler would continue to make the variable value available.

In regards to statement reordering/elimination, the debugging of such optimized code is rendered difficult due to the fact that the user is conversant with the sequence of actions of the source code and expects the machine code to operate, with the same sequence of operations.

When debuggers attempt to debug optimized code, they approach the statement re-ordering problem in a relatively simplistic manner. Debuggers generally run the program in the revised order in which the compiler has placed the machine instructions and display to the user that order. The debugger may, in addition provide some information to the user which indicates the fact of a re-ordering at the place in the code where the re-ordering occurred. Such a debugging operation is described in "DOC: a Practical Approach to Source-Level Debugging of Globally Optimized Code," Coutant et al., Proceedings of SIGPLAN 1988, Conference on Programming Language Design and Implementation, Atlanta, Ga., 1988, pgs. 125–134. The prior art has also suggested the use of graphical display techniques to assist a user in tracking the altered execution order of the machine code from the source code.

Notwithstanding such debugging aids, statement reordering/elimination still presents significant difficulties to the user during a debugging operation.

Prior art solutions to variable lifetime shortening have included the following: (i) making a register allocator function lengthen register lifetimes to as long a period as possible; and (ii) causing a debugger to recognize when a variable's lifetime has ended or may have ended and to print a warning of the lifetime end of the variable. The first of these solutions compromises the compiler's ability to optimize the machine code and, at best, only reduces the frequency with which data is lost. It does not prevent the loss of the data. The second solution simply tells the user when the problem arises, but doesn't stop it from arising.

Such solutions are discussed in the following prior art references: "Evicted Variables and the Interaction of Global Register Allocation and Symbolic Debugging", Adl-Tabatabai et al., ACM-20th PoPL, January 1993, pgs. 371–383; "Detection and Recovery of Endangered Variables Caused by Instruction Scheduling", Adl-Tabatabai et al., ACM-SIGPLAN-PLDI, June 1993, pgs. 13–25; and "Debugging Optimized Code Without Being misled", M. Copperman, Report 92-01, May 8, 1992, Board of Studies in Computer and Information Sciences, University of California at Santa Cruz, Calif. 95064.

There is a need for a more efficient method for debugging optimized machine code which avoids the problems created by the discard of variable values and statement reordering or elimination.

SUMMARY OF THE INVENTION

A debugging method is described wherein a debug information file is constructed which includes information that identifies changes of variable value assignments to registers at plural steps of program. The information further includes data that identifies any change of sequence of machine code instructions from the sequence of source code statements that gave rise to the machine code instructions. Using such information, hidden breakpoints are inserted into the machine code (wherein a hidden breakpoint enables access to an instruction to either store a variable value from an identified register or to move to a machine code instruction that corresponds in order to a source code statement that gave rise to the machine code instruction). Thereafter, the program is executed under control of a debug program and, upon encountering a hidden breakpoint, automatically either stores the variable value that exists in the identified register or moves to execute a machine code instruction that is indicated by the hidden breakpoint. The actions carried out in response to a hidden breakpoint are invisible to the user.

BRIEF DESCRIPTION OF THE DRAWINGS

FIG. 4 illustrates the action of the debugger program in response to encountering one or more hidden breakpoint types.

DETAILED DESCRIPTION OF THE INVENTION

Figure 1:
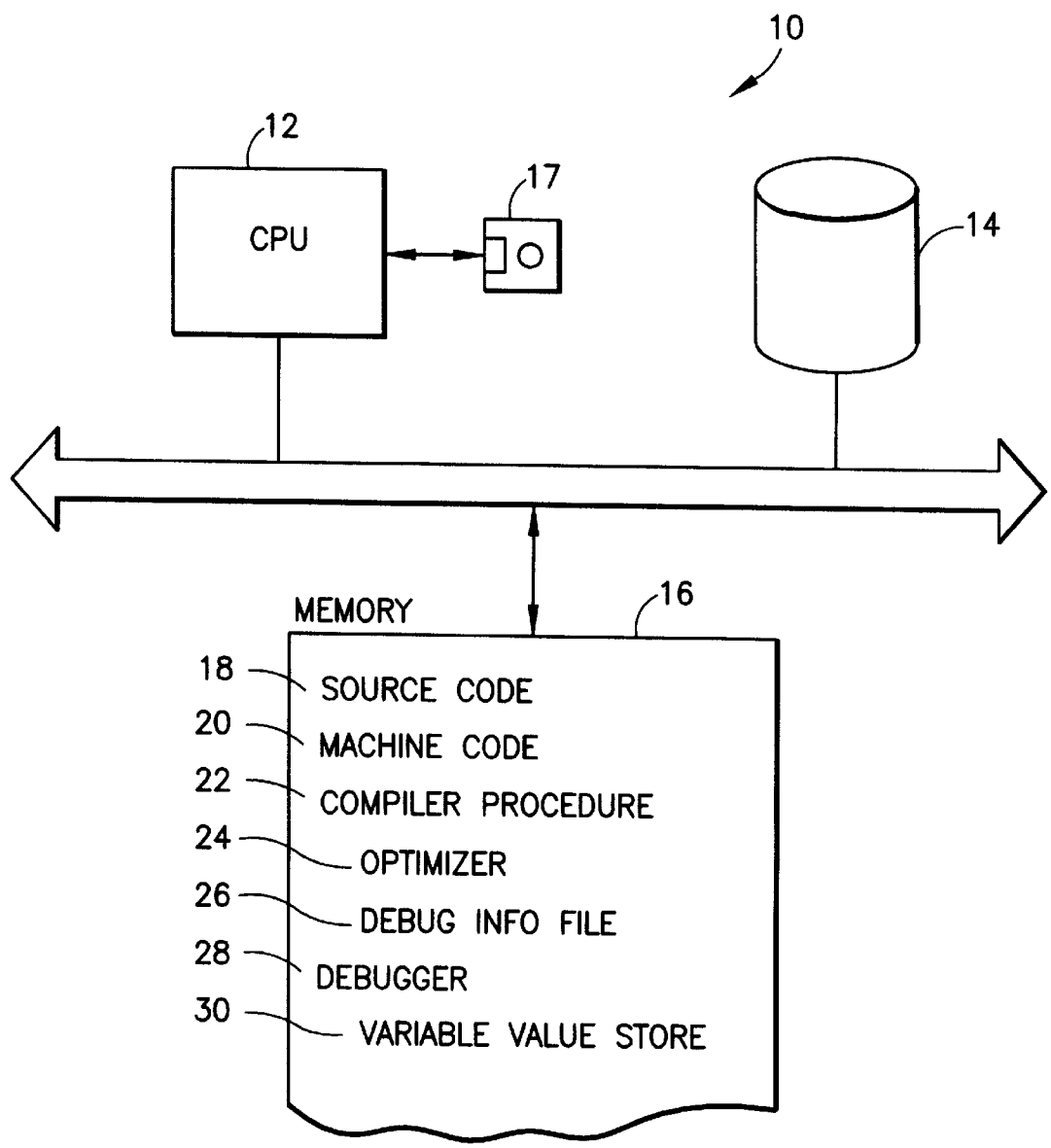
FIG. 1 is a block diagram of a system that incorporates the invention.

A computer 10 for carrying out the invention includes a central processing unit (CPU) 12, a disk drive 14 and a random access memory (RAM) 16. For the purposes of explaining the invention, it will be assumed that all of the software/firmware required to carry out the invention is a contained within RAM 16. However, it is to be understood that such software/firmware may also be stored in disk drive 14 or on one or more media disks 17 for insertion into CPU 12 and RAM 16 on an as-needed basis.

Accordingly, RAM 16 includes a source code listing 18 that is to be converted into a machine code listing 20 by a compiler procedure 22. Compiler procedure 22 includes an optimizer procedure 24 that, in the known manner, performs optimizing actions on an intermediate form code derived from source code 18 by the compile action. During the course of the compile and optimization actions, compiler procedure 22 constructs a debug information file 26 that includes descriptive information regarding actions taken by the compiler during the compile action.

A debugger procedure 28 is utilized by the user to step through machine code 20, after the compile action is complete, to enable a debugging of any errors in the program. Debugger procedure 28 creates a variable value store 30 during initialization time. Variable value store 30 is thereafter used, during execution of debugger 28, to store variables that would otherwise be discarded upon reassignment of registers to new variable values.

The invention modifies compiler procedure 22 and debugger procedure 28 in such a manner as to enable debugger 28 to arrange the execution of machine instructions in terms of the order of statements in the original source program, even though optimizer procedure 24 may have overwritten registers containing user variables or may have altered the order in which the source statements are actually executed. To accomplish this action, debugger procedure 28 places hidden breakpoints, (i.e., trap instructions or their equivalent) in the machine code before any overwriting occurs of a critical register or before a machine code instruction is executed out of order of the source code. When, during program execution, a hidden breakpoint is encountered, debugger procedure 28 takes an appropriate action—as instructed by a directive, corresponding to the breakpoint, in debug information file 26. Either a copy of a variable in a register that is about to be overwritten is saved or a location counter, including an address of a next-to-be-executed machine code instruction, is altered to redirect the execution to a further machine code instruction that is next in sequential order in accordance with the order of the source statements.

These actions enable a user to manipulate a program as though the machine code statements are being executed in the order given by the source code. The user can thus examine or modify variables as though the machine code is manipulating the variables in the same order as the source code.

The use of hidden breakpoints to enable variables in registers to be copied solves the problem of variable value discard that is created during an optimization action. Compilers typically re-use a register as soon as possible after the variable value stored therein is no longer needed. This typically means that the user cannot interrogate or find the value of a variable after the last statement that uses it. By copying the data from the register into an internal variable value store 30, debugger procedure 28 effectively lengthens the variables' lifetime, allowing the user to interrogate debugger procedure 28 about the variable's value, even after it has disappeared from the executing program.

Executing machine instructions in an order other than the order that the compiler directed is generally not without problems. The relocated instructions may manipulate variables whose assignments to registers or memory locations are different in the original instruction location and in the moved location. Temporary registers may also be used that were not "live" in the original location but contain important data in the moved location. Therefore, debugger procedure 28 may need to save, restore and otherwise manipulate register allocations when a hidden breakpoint is reached.

Figure 2:
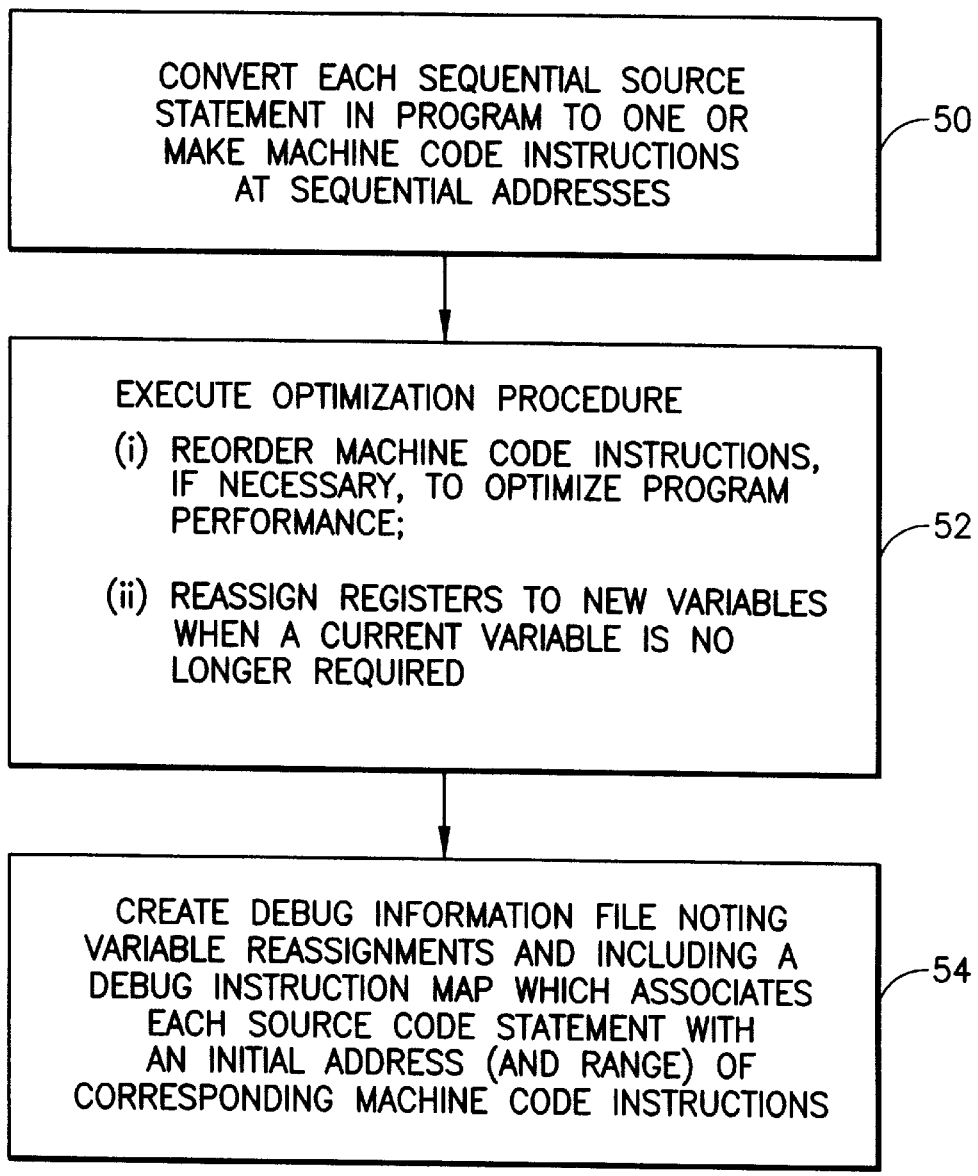
FIG. 2 is a logical flow diagram illustrating the operation of a compiler in creating a debug information file used with the invention.
Figure 3:
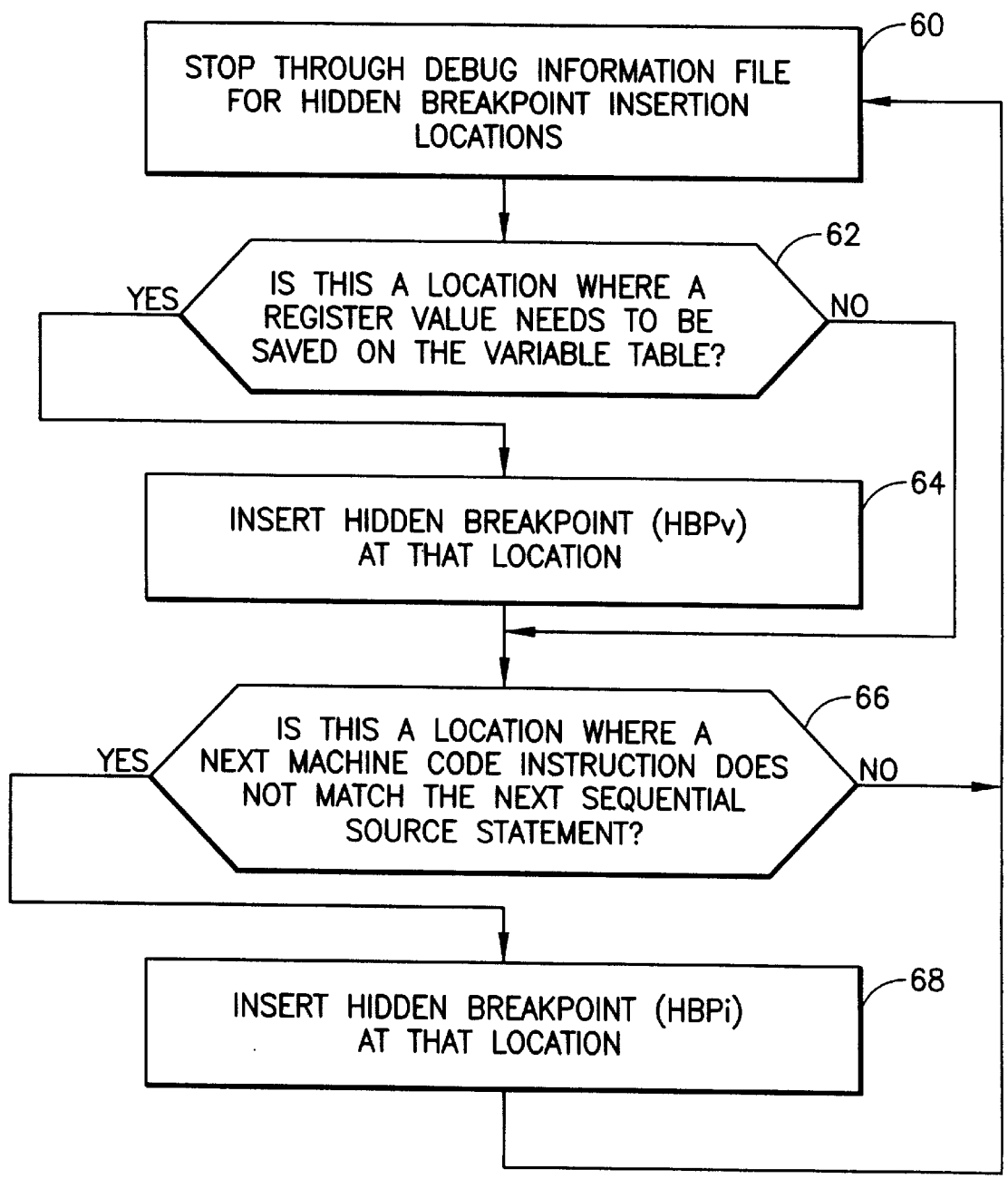
FIG. 3 is a logical flow diagram illustrating initialization actions of the debugger program, in carrying out the invention.

Turning now to the flow diagrams shown in FIGS. 2–4, a detailed description of the method of the invention will be presented. Thereafter, an example will be provided to further illustrate the operation of the invention.

Initially compiler procedure 22 is invoked and converts each sequential source statement to one or more machine code instructions that are stored at sequential addresses (step 50). During this conversion, optimizer procedure 24 is executed and both reorders machine code instructions to optimize program performance, and reassigns registers to new variables when a current variable is no longer needed during further execution of the program (step 52). During operation of compiler procedure 22, debug information file 26 is created and records, among other things, points in the machine code listing wherein variable reassignments occur.

Debug information file 26 is also provided with a debug instruction map which associates each source code statement with an initial address (and range of succeeding addresses) of machine code instruction(s) which correspond to the source code statement. Those skilled in the art will realize that it often occurs that a number of machine code statements are required to complete execution of a single source statement (step 54).

Compiler 22 records in debug information file 26 a list of all locations in machine code 20 where variables need to be saved or where the sequential flow does not match that of source code 18. These are the locations at which hidden breakpoints must be placed. For each breakpoint location listed, debug information file 26 also has a corresponding directive to debugger 28 telling what action to take. That action may be a manipulation of registers and internal variables, and/or a change in the flow of machine code instruction execution.

At the termination of the compile action, a machine code listing 20 is available to the user for both execution and debugging.

Initially, the user runs machine code listing 20 and determines if any bugs result. If bugs are found, debugger procedure 28 (see FIG. 3) is invoked to place a hidden breakpoint into the machine code listing 20 at each point where a register is reassigned to a new variable when the old contents might still be needed (step 64), or where the sequential flow of instructions in machine code 20 does not match the flow in source code 18 (step 68). Debugger 28 uses debug information file 26, which lists all such breakpoints, to accomplish this.

If a register is being reassigned to a new variable value, a hidden breakpoint (HPBv) instruction is inserted immediately above the current machine code instruction. The information in the debug information file 26 corresponding to this HBPv instruction includes a command to transfer the variable value from the register that is about to be reassigned, to variable value store 30 (step 64).

If the debug information file 26 indicates that the next machine code instruction at any point does not correspond to the sequential flow of the source code 18, a hidden breakpoint (HBPi) is placed at that location. For each such breakpoint location, debug information file 26 also has a corresponding directive to debugger 28 telling what machine code instruction to switch to that corresponds to the next-in-sequence source statement (step 68).

Once the initialization actions of debug procedure 28 have been completed and all of the hidden breakpoints inserted, debug execution can take place, as shown in step 72 in FIG. 4. Simply stated, as debug procedure 28 encounters either an HBPV or an HBPi, the action commanded by debug information file 26 corresponding to that breakpoint is executed, without either user knowledge or user intervention. Thus, if an HBPv is encountered, the variable that is present in a register (to be reassigned) is stored in variable value store 30. In similar fashion, if an HBPi is encountered, the next instruction to be executed is the machine code instruction indicated by the HBPi (and is the one that is next in sequence in source order).

Accordingly, each of the variable values utilized in the machine code is stored in variable value store 30 and is available for review by the user, upon request. Further, the machine code, under control of the debugger procedure 28, executes in a manner as though it is arranged in source code order.

As indicated above, to the extent that register reassignments and variable values have to be modified to accommodate the insertion of HBPi commands, such actions are taken by debugger 28 during the initialization phase when each HBPi is inserted.

Hereafter, an example will be presented of both the insertion of standard debug breakpoints and hidden breakpoints to further illustrate the operation of the invention in contrast to standard debug actions.

Debug information is commonly used to acquire:

"lines" information which tells the debugger where to put a regular breakpoint, i.e. a trap instruction, when the user requests a breakpoint at a given line.

"symbol" information which tells the debugger how to access a variable when requested to do so by the user.

Assume that the source program says:

(13)X=3.0;

(14)I=J+3 and that the compiler has compiled those statements so that, after optimization and register allocation, the machine listing looks as follows:

(0x4310) LD[PC+27B0], FP3//statement at line 13

(0x4314) ADDI R2, 3, R5//statement at line 14

Then the "lines" part of the debug information needs to say something like (in small part):

| line | instruction address |
|------|---------------------|
| . | |
| . | |
| . | |
| 13 | 0X4310 |
| 14 | 0X4314 |

| line | instruction address |
|------|---------------------|
| . | |
| . | |
| . | |

And the "symbol" part needs to say something like:

| | symbol | instruction range | location |
|---|---|---|---|
| these 3 are relevant | { X | 4200–43C0 | FP3 (floating point register) |
| | { I | 4260–4328 | R5 (integer register) |
| | { J | 4260–4410 | R2 (integer register) |
| | J | 4414–5000 | R7 |
| | X | 43C4–43D0 | memory at 10370 |

The register allocator puts variables into different registers at different points in the program. All of the various lifetime segments need to be indicated in the debug information. In the example, variable J was in register 2 up through location 4410, and then was moved (for reasons known only to the register allocator) into register 7.

When the debugger starts debugging the program, it accesses this debug information, so that it knows how to proceed. The debug information is used to direct the debugger's behavior in response to various inputs and events. How it responds is approximately as follows.

User types a command "break at line N"

The debugger looks up N in the debug information and places a trap instruction in the machine code program at that address. For example, to place a breakpoint at line 14, the debugger looks up 14 in the "lines" information, getting address 0x4314. It places a trap instruction there. That location has an "ADDI R2,3,R 5" instruction. So the computer will now stop just before it would execute that instruction (which performs the statement "I=J+3").

Debugger is informed by the operating system that the program has hit a trap

The debugger looks up the trap address (e.g. 0x4314) in the "lines" information, obtaining 14. The debugger then prints a notification that the program has stopped at line 14, perhaps displaying the source file with an arrow at line 14.

User types a command to print a variable

The debugger notes the instruction address at which the program stopped, and searches the "symbol" part of the debug information for a record showing the given symbol and an instruction range that encompasses the current program address. For example, if the program is stopped at location 4314 and the user types, "print X", the debugger finds the record X|4200-43C0|FP3 and then prints the contents of FP3. Since the computer has stopped just after the instruction (LD {PC+27BO}, FP3) which had loaded the constant 3.0 into register FP3, the debugger prints out the value 3.0.

User types a command to set a variable to a given value

The debugger looks up the variable and instruction address as before, obtaining a register. It then deposits the given value into that register. For example, if the program has stopped at location 4314 (that is, source line 14) and the user types "set J=9", the debugger looks up variable J, obtaining register R2. It then places the value 9 into R2. If a command is given to continue execution of the program, the computer executes "ADDI R2, 3, R5". This is added to the contents of R2 (i.e., 9 to the constant 3) and the result is stored in R5. R5 will thus be set to 12, which is the desired result of executing the source line "I=J+3 after manually setting J to 9.

In the above, the debugger did not deposit trap instructions, other than in response to user commands to place a breakpoint at a given source line. There are no "hidden" traps. In the invention, the debugger places additional trap instructions in the program, above and beyond the ones that are explicitly requested by the user. Those traps are placed during debugger initialization, and before the application program begins.

For example, if variable J does not appear to be used after line 14, the register allocator will "kill" it at that point:

| | |
|---|---|
| 4310 LD [PC+27BO], FP 3 | // line 13 |
| 4314 ADDI R2, 3, R5 | // line 14 |
| 4318 MOVI 17, R2 | // R2 used for something else; no longer has J. |

But, if a breakpoint is placed at line 20 (resulting in a trap instruction at location 4390) the program will stop there. Since the variable J is still lexically "in scope" at line 20, the user can ask for the value of J.

In the invention, the debugger secretly copies the value of R2 just before location 4318. So the debug information acquires a new section, called, for example, "hidden actions". It contains records such as:

| instruction address | action | from | to |
|---|---|---|---|
| . | . | . | . |
| . | . | . | . |
| . | . | . | . |
| 4328 | copy | R2 | $$-JSAVE |
| . | . | . | . |
| . | . | . | . |
| . | . | . | . |

When the debugger starts and before it allows the application program to run, it scans the "hidden actions" table, silently placing trap instructions at the indicated locations. Thereafter, whenever the debugger is told by the operating system that the program has trapped, it looks up the trap address in both the "lines" information (as before) and in the "hidden actions" information. If it finds it in the latter, it performs the indicated action and resumes execution, without giving any indication to the user. In this example, it copies R2 (the value of J that is about to be killed) into an interval symbol table entry "$$-JSAVE". (The debug information tells the debugger what hidden symbols it needs to create.)

Accordingly, the "symbols" information has a new entry:

| symbol | instruction range | location |
|---|---|---|
| J | 4414–4398 | $$ - JSAVE |

Now, if the program is stopped at line 20 (location 4390), the debugger is able to print the value of J, even though it does not exist in any register in the running program.

It should be understood that the foregoing description is only illustrative of the invention. various alternatives and modifications can be devised by those skilled in the art without departing from the invention. Accordingly, the present invention is intended to embrace all such alternatives, modifications and variances which fall within the scope of the appended claims.

What is claimed is:

1. A method for debugging a program, said method comprising the steps of:
    a) deriving a debug information file that includes information that identifies a point in said program at which a variable value is discarded from a register;
    b) inserting a hidden breakpoint (HBP) into said program using said information from said debug information file, said HBP enabling access to a directive; and
    c) executing said program and, upon encountering said HBP, performing said directive,
    wherein said directive causes a storage of said variable value from said register, and
    wherein said variable value is thus available subsequent to said discarding from said register.

2. The method as recited in claim 1, wherein step c) operates under control of a debug program.

3. The method as recited in claim 1, wherein said point in said program is a point at which a new variable is assigned to said register.

4. The method as recited in claim 1, wherein step a) is performed during a compile action of said program and step b) is performed by a debug program.

5. The method as recited in claim 1, wherein said variable value that is stored in step c) is available for later evaluation by a user during a debug action.

6. A method of debugging a program of machine code instructions that have been re-ordered, said method comprising the steps of:
    a) deriving a debug information file that includes information that identifies a point in said program at which a sequence of machine code instructions deviates from an order that corresponds to a sequence of source code statements from which said machine code instructions were derived;
    b) inserting a hidden breakpoint (HBP) into said program using said information from said debug information file, said HBP enabling access to a directive; and
    c) executing said program and, upon encountering said HBP, performing said directive,
    wherein said directive causes a transfer of control to a machine code instruction that corresponds to a next-in-order source code statement.

7. The method as recited in claim 6, wherein step c) is performed under control of a debug program.

8. The method as recited in claim 6, wherein said point in said program is a point at which a reordering of said machine code instructions occurred as a result of an optimization action by a compiler program.

9. The method as recited in claim 6, wherein step a) is performed during a compile action of said program and step b) is performed by a debug program.

10. A memory media for controlling a computer to debug a program, said memory media comprising:
    a) means for controlling said computer to derive a debug information file that includes information that identifies a point in said program at which a variable value is discarded from a register;
    b) means for controlling said computer to insert a hidden breakpoint (HBP) into said program, using said information from said debug information file, said HBP enabling access to a directive; and c) means for controlling said computer to execute said program and, upon encountering said HBP, to perform said directive, wherein said directive causes a storage of said variable value from said register, and wherein said variable value is thus available subsequent to said discarding from said register.

11. The memory media as recited in claim 10, wherein means c) operates under control of a debug program.

12. The memory media as recited in claim 10, wherein said point in said program is a point at which a new variable is assigned to said register.

13. The memory media as recited in claim 10, wherein means a) operates during a compile action of said program and means b) is performed under control of a debug program.

14. A memory media for controlling a computer to debug a program of machine code instructions that have been reordered, said memory media comprising:

a) means for controlling said computer to derive a debug information file that includes information that identifies a point in said program at which a sequence of machine code instructions deviates from an order that corresponds to a sequence of source code statements from which said machine code instructions were derived;

b) means for controlling said computer to insert a hidden breakpoint (HBP) into said program using said information from said debug information file, said HBP enabling access to a directive; and c) means for controlling said computer to execute said program and, upon encountering said HBP, to perform said directive, wherein said directive causes a transfer of control to a machine code instruction that corresponds to a next-in-order source code statement.

15. The memory media as recited in claim 14, wherein means c) is performed under control of a debug program.

16. The memory media as recited in claim 14, wherein said point in said program is a point at which a reordering of said machine code instructions occurred as a result of an optimization action by a compiler program.

17. The memory media as recited in claim 14, wherein means a) operates during a compile action of said program and means b) is performed under control of a debug program.

\* \* \* \* \*